United States Patent [19]

Baskin

[11] Patent Number: 4,734,302

[45] Date of Patent: Mar. 29, 1988

[54] PROCESS FOR FORMING SIMULATED STONE AND RESULTING PRODUCT

[76] Inventor: David Baskin, 161 Lake Shore Dr., Duxbury, Mass. 02332

[21] Appl. No.: 6,894

[22] Filed: Jan. 27, 1987

Related U.S. Application Data

[63] Continuation of Ser. No. 788,798, Oct. 18, 1985, abandoned.

[51] Int. Cl.[4] .............................................. B32B 5/16

[52] U.S. Cl. ...................................... 428/15; 427/198; 427/199; 427/204; 427/355; 427/369; 428/143; 428/331; 428/542.2

[58] Field of Search .............. 428/15, 331, 143, 542.2; 427/198, 204, 199, 262, 355, 369, 180

[56] References Cited

U.S. PATENT DOCUMENTS

| | | | |
|---|---|---|---|
| 1,862,875 | 6/1932 | Weber | 427/262 |
| 2,701,774 | 2/1955 | Marsell et al. | 427/204 |
| 2,953,469 | 9/1960 | Fox | 427/204 |
| 3,341,396 | 9/1967 | Iverson | 428/15 |
| 3,773,886 | 11/1973 | Starr et al. | 428/15 |
| 3,836,619 | 9/1974 | Volent | 428/15 |

FOREIGN PATENT DOCUMENTS

| | | | |
|---|---|---|---|
| 844476 | 8/1960 | United Kingdom | 427/204 |

*Primary Examiner*—Paul J. Thibodeau
*Attorney, Agent, or Firm*—Wolf, Greenfield & Sacks

[57] ABSTRACT

The invention relates to synthetic coatings applied to substrates to simulate natural stone. The synthetic coatings are curable and saturated with a thin coating of fine particulate material. An implement is then used to tamp the coated surface to produce a natural stone appearance.

28 Claims, 8 Drawing Figures

PROCESS FOR FORMING SIMULATED STONE AND RESULTING PRODUCT

RELATED APPLICATIONS

This application is a continuation of application Ser. No. 788,798, filed Oct. 18, 1985, and now abandoned.

BACKGROUND OF THE INVENTION

This invention relates to synthetic coatings which simulate natural stone.

In general, simulated natural stone products are prepared in casts or molds Casting and molding have, however, many drawbacks. In many instances, the cast or molded product is not a finished product, but is rather a panel or laminate which is applied over another surface. Thus, casting and molding cannot always be carried out at the same location at which the final product is prepared. An additional step of applying the panel or laminate to another surface is also required. This not only results in additional time and expense in preparing the final product, but also may result in faulty application or other handling errors which may damage the panel or laminate. Finally, the panel or laminate can only be applied to surfaces that are generally smooth and flat.

U.S. Pat. No. 3,341,396 discloses a process for coating a substrate with a simulated natural stone coating. The process, however, is limited to applications on horizontal surfaces or surfaces having a generally circular cross section and rotated about a horizontal plane.

SUMMARY OF THE INVENTION

It is an object of this invention to provide a simulated natural stone coating that may be applied to surfaces having various shapes.

Another object of this invention is to provide a simulated natural stone coating that may be applied to a substrate at the job site.

Another object object of this invention is to provide a simulated natural stone coating that may be applied to surfaces that are vertically oriented.

Another object of this invention is to provide a simulated natural stone coating that may be prepared and applied to a substrate without first curing or otherwise molding or casting the coating.

Still another object of this invention is to provide a simulated natural stone coating that is quickly and easily applied to a substrate.

Still another object of this invention is to provide a simulated natural stone product and process for making the same that are less expensive than other known simulated natural stone products and processes.

Still another object of this invention is to provide a simulated natural stone product that looks and feels more like natural stone than any other known simulated natural stone product.

According to the invention, a method for making a simulateo natural stone product is provided. The method includes applying a curable synthetic resin composition to a substrate, applying a thin coating of the fine particulate material to the surface of the composition, contacting the surface with an implement to produce a surface which simulates natural stone, and allowing the resin composition to cure.

Also according to the invention, a simulated stone product is made from a substrate, a curable synthetic resinous composition applied to the substrate, and a thin coating of fine particulate material applied to the surface of the composition and contacted with an implement before the composition cures to produce a surface simulating natural stone.

Also according to the invention a color pigment may be applied to the surface of the resin composition prior to applying the thin coating of fine particulate material in order to simulate a marble product. A thermoplastic sheet may be applied after the composition cures to provide a scratch resistant barrier.

DETAILED DESCRIPTION OF THE DRAWINGS

Figure 1:
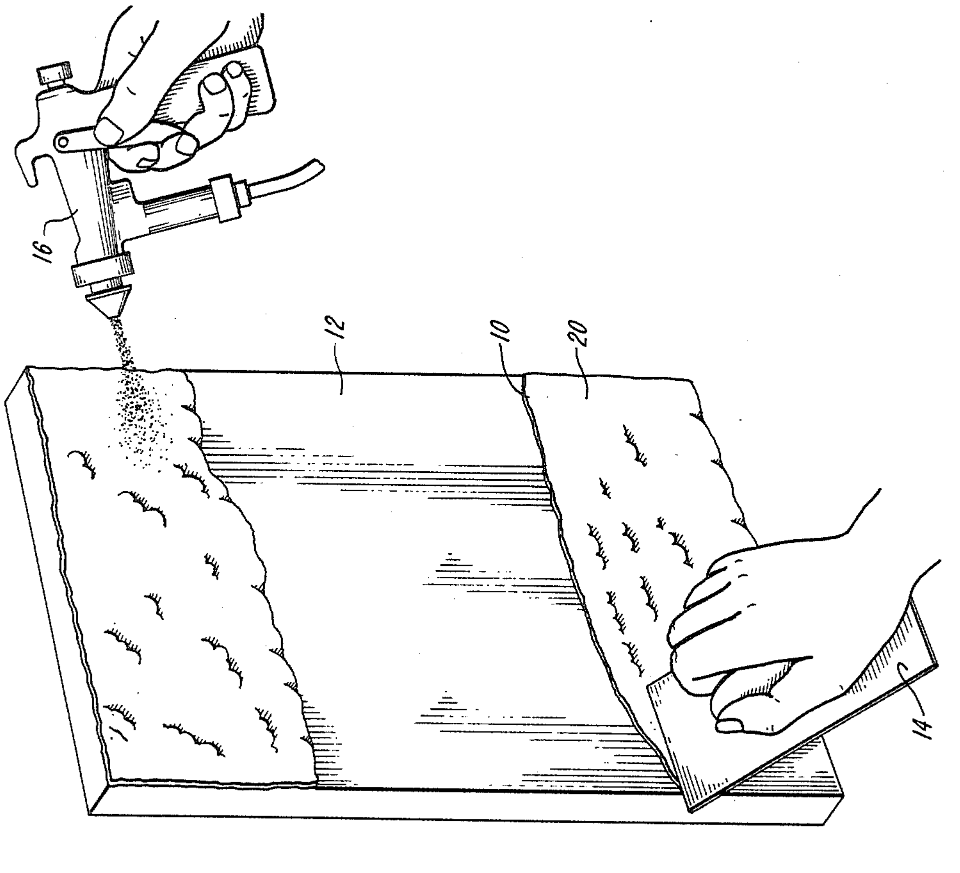
FIG. 1 illustrates two methods of applying the resin composition to a substrate.

FIG. 1 illustrates the application of a curable synthetic resin composition 10 to a substrate 12. The curable synthetic resin composition 10 may be applied to the substrate 12 by troweling with a trowel 14 or spraying with a spray gun 16. It should be noted that the resin composition may be applied to the substrate by other suitable methods such as brushing or rolling.

The curable synthetic resin composition 10 useful for carrying out this invention may have as a component a polyester, epoxy, urethane or cementitious base. Virtually any curable synthetic resinous liquid coating material may be used. The preferred coating materials are the polymerizable unsaturated polyesters such as those prepared from ethylenically unsaturated polycarboxylic acids and polyhydric alcohols. Such coating materials may also contain a copolymerizable ethylenically unsaturated compound such as styrene to make the unsaturated polyester resin more fluid and also to cross link the resin at the time of curing. In the most preferred embodiment, the primary component of the curable synthetic resin composition is PolyLite® Polyester Resin 33-031, sold by Reichhold Chemicals, Inc. of Elizabeth, N.J. PolyLite Polyester Resin 33-031 is an unsaturated polyester resin in styrene monomer and is thixotropic and prepromoted for room temperature cure with the addition of Methyl Ethyl Ketone Peroxide. Its boiling point is approximately 295° F. and its specific gravity is 1.05–1.22 at 25° C. ($H_2O=1$). It is approximately 44–48% styrene monomer and its viscosity is 350–550 (Brookfield Model LVF #3 at 60 rpm CPS).

Thickening agents may also be added to the curable synthetic resin composition to thicken the composition to a degree suitable for a particular method of application and/or suitable for application to a particular surface. For example, application by troweling generally requires a thicker composition than application by spraying. Also, surfaces oriented vertically require a thicker composition than surfaces oriented horizontally. A composition applied to a vertically oriented surface may run or drip producing imperfections if it is too thin. Generally, a thickener is added to achieve a composition having a consistency that will not run or sag after it is applied to a particular surface. In the most preferred embodiment, CAB-O-SIL®M-5 Fumed Silica, an amorphous fumed silica, having a specific surface area of 200 plus or minus 25 square meters/gram as determined by B.E.T. method, sold by Cabot Corporation of Tuscola, Ill., is used as the thickener.

It is also desirable to add one or more matrix fillers to the composition to reduce the cost and/or influence the consistency of the composition. Matrix fillers are also used to influence the strength of the cured composition. The filler is preferably finally divided, having an average particle size falling between 10 and 325 grit. The filler may be any one of the well-recognized fillers used in the prior art including powdered talc, powdered quartz, fine silica, diatomaceous earth, gypsum, powdered glass, clay minerals such as china clay (Kaolin), illite, powdered chalk, powdered marble, powdered limestone, aluminum silicate, aluminum stearate, calcium silicate, boracite, borax, and alumina trihydrate. The latter, alumina trihydrate, is especially effective in improving the fire-resistant properties of the final product and is the preferred filler.

The filler can contribute to the color, transparency, and surface properties of the cured composition. Therefore, it is appropriate to use different fillers when simulating different stones. For example, when simulating marble, the general criteria for the filler is one which, when homogeneously mixed into the matrix resin, produces a product which is translucent. In this manner, a depth is given to the product which helps create the appearance of marble. The amount of filler and the particle size of the filler may also influence the translucency of the final product.

It is also appropriate to dilute the composition with a solvent to provide a viscosity that is appropriate for the manner in which the composition is to be applied. Spraying, for example, requires a much less viscous composition than troweling. Thus, to achieve a viscosity suitable for spraying, a solvent is added. The solvent is selected such that it quickly evaporates. The solvents particularly adopted for use in the present invention include acetone, methyl ethyl ketone, xylene, ethynol and the like. Acetone is the preferred solvent.

Color pigment may be added to the composition so that the color of the composition has the desired background color. The color pigment is preferably an inert, inorganic, finely divided substance applied either as a dry powder or in paste form. Such color pigments are commonly known and readily available. Preferably the color pigment is a selected P.M.S. polyester-dispersed pigment, available from P.M.S. Consolidated of Somerset, N.J.

Finally, a polymerization catalyst or mixture of catalysts is added to the composition. Such catalysts are well-recognized in the art and usually free radical catalysts based on a peroxide-type compound such as for example methyl ethyl ketone peroxide, benzoyl peroxide, tertiary butyl, hydroperoxide, and the like. Typically, the catalyst may be present in amounts ranging from about 0.1 to 6% by weight of the polyester resin.

The synthetic resin composition 10 is coated onto a substrate 12 before the composition hardens or cures. Curing time will depend of course upon which resin and catalyst are chosen for the synthetic resin composition 10. The composition may be coated onto a wide variety of substrates including, wood, particle board, sheetrock, beaver board, pressed woods such as those sold under the trademarks "Masonite" and "Timblend", various pressed fiberboards, cardboard, paper, textile fabrics, plastic sheets, fiberglas, cement blocks, bricks, metals, or other common building materials.

Figure 2:
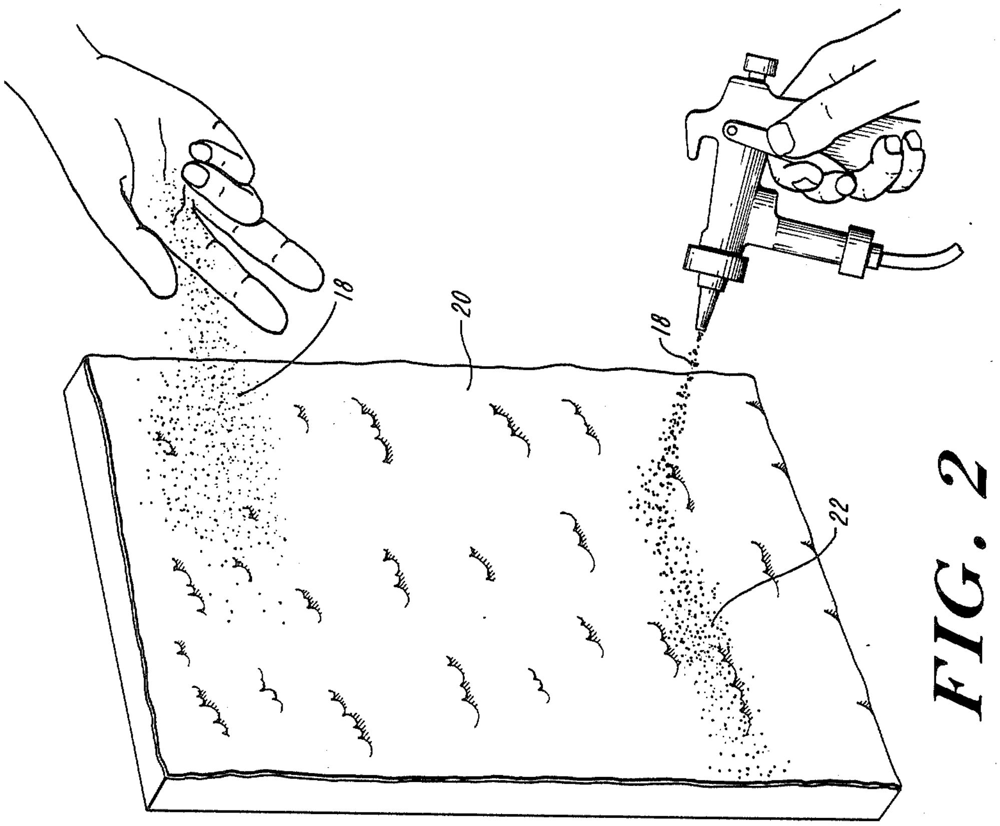
FIG. 2 illustrates two methods of applying a thin coating of fine particulate material to the surface of the composition.

Resin composition 10 is coated onto a substrate to yield a coated surface 20. (FIG. 1) The coated surface is tacky. Next, a fine particulate material 18 is applied to the coated surface 20 in a manner and in an amount so as to saturate the coated surface 20 with the fine particulate material 18 (FIG. 2). Essentially, a thin coating of the fine particulate material sticks to and covers the coated surface 20 so that it is no longer tacky. The fine particulate material 18 may be applied, as shown in FIG. 2, by hand-sprinkling or by spraying it onto the coated surface 20. Any method of applying the fine particulate material 18 to the coated surface 20 so that the coated surface 20 is no longer tacky to the touch of the hand will suffice.

The particles may become imbedded in the coated surface to further enhance the natural look of the finished product. The particle size of the fine particulate material 18 is preferably between 45 and 200 grit, although particle sizes outside this range are possible. The fine particulate material may be made from particles naturally occurring in stone. Likewise, the fine particulate material may be made from particles simulating those naturally occurring in stone. On the other hand, it is possible and sometimes preferable to use particles that do not naturally occur in or simulate those occurring in stone. In particular, it is sometimes preferable to use particles that will be translucent after their application. This will be discussed in greater detail below.

Figure 3:
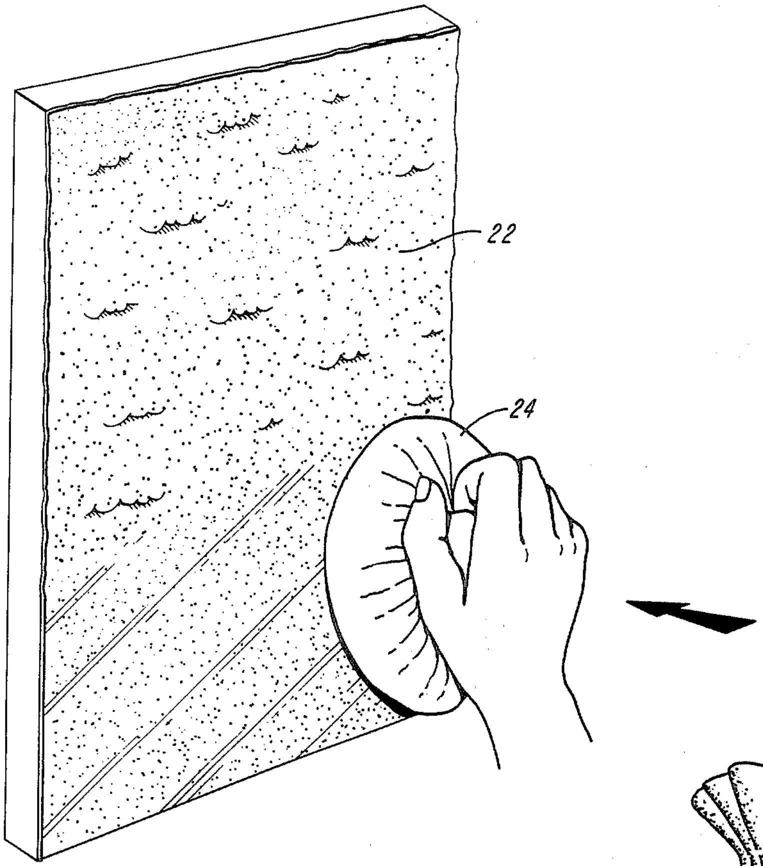
FIG. 3 illustrates the preferred method of contacting the particulate coated surface with an implement.

FIG. 3 illustrates the treatment of the particulate coated surface to produce a surface simulating stone. An applicator 24 is applied to the particulate coated surface 22 in a blotting action. The thin coating of particles prevents the applicator from sticking to the tacky resin composition. This blotting action and the fine particular material 18 together act to produce a surface simulating natural stone. The slick, glossy, "plastic" appearance of the resin composition is transformed to look entirely real; the surface becomes non-glossy with natural tones, textures and irregularities.

The resin is then allowed to cure. Preferably the cured resin should have a Barcole hardness of between zero and 55.

A wide range of surfaces can be produced by a combination of composition application technique, particle size of the fine particular matter and blotting technique. For example, by applying the composition onto the substrate in a relatively smooth layer and applying a strong force when blotting, a smooth surface simulating finished cut stone can be achieved. Likewise, by troweling the composition onto the substrate in a manner that leaves rough and ragged edges and by applying a light pressure when blotting, a ragged and rough stone appearance can be achieved.

The resin composition 10 is preferably applied to a substrate 12 to form a coated surface 20 that is between 1/32 and 3/32 of an inch thick. However, the coated surface may be just thick enough to cover the substrate or as thick as one-half inch. Generally, to achieve a final product having a rough surface requires a thicker coating than to achieve a final product having a smooth surface. The type of stone being simulated can also influence the choice of the thickness for the coating. For example, natural marble is somewhat translucent and has the appearance of having depth. When simulating marble according to this invention, it is desirable to apply the resin composition in a thickness of at least 1/32 of an inch to achieve a similar translucent appearance. Granite, on the other hand, is not very translucent and a simulated granite surface can be achieved using a thinner coating.

Figure 4:
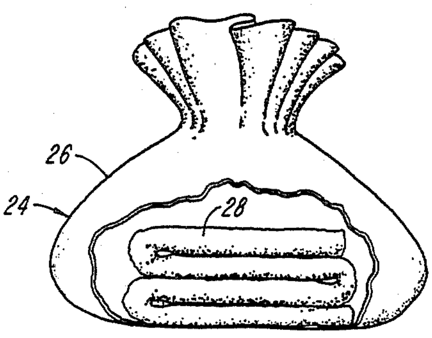
FIG. 4 is a schematic view of the construction of the implement shown in FIG. 3.

As shown in FIG. 4, the applicator 24 in the preferred embodiment is a soft cloth 26 tied off like a sack to enclose a material 28, preferably a folded or wadded towel or second cloth. The soft cloth 26 which acts as the outer surface of the applicator is grain-free such that it will not print a pattern on the particulate coated surface when it is used as an applicator in a blotting action according to the invention. It should be appreciated that many other implements can be substituted for the applicator 24 used in the preferred embodiment to achieve the same results.

Figure 5A:
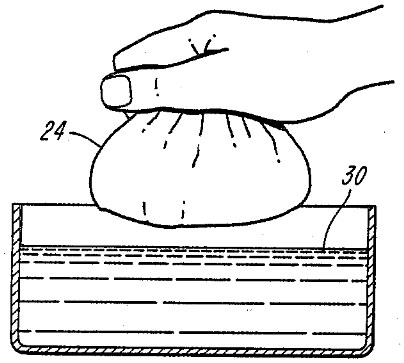
FIGS. 5*a*–5*c* illustrate another method of applying a thin coating of fine particulate material to the surface of the composition and of contacting the particulate coated surface with an implement.
Figure 5B:
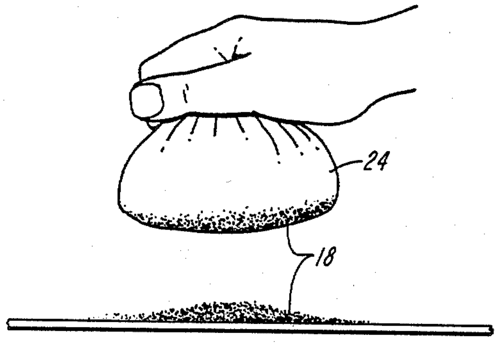
Figure 5C:
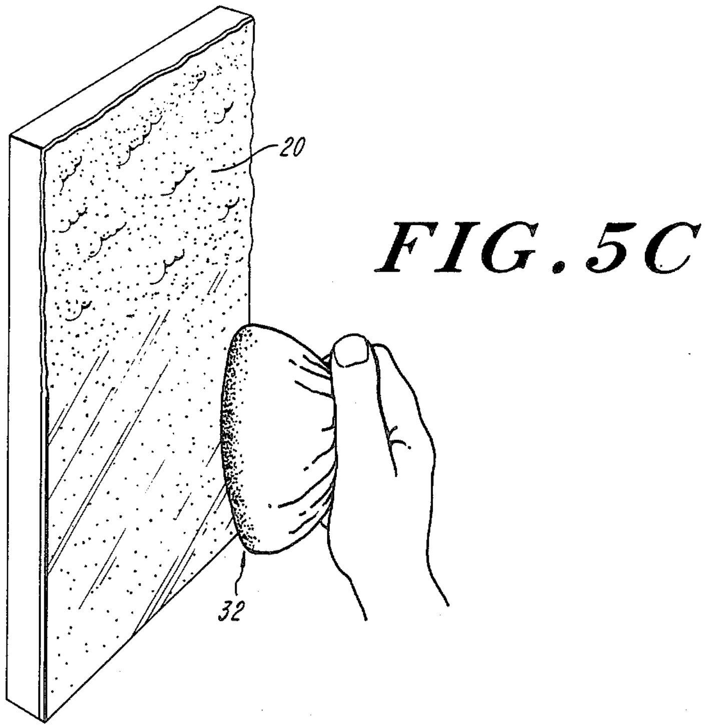
Figure 6:
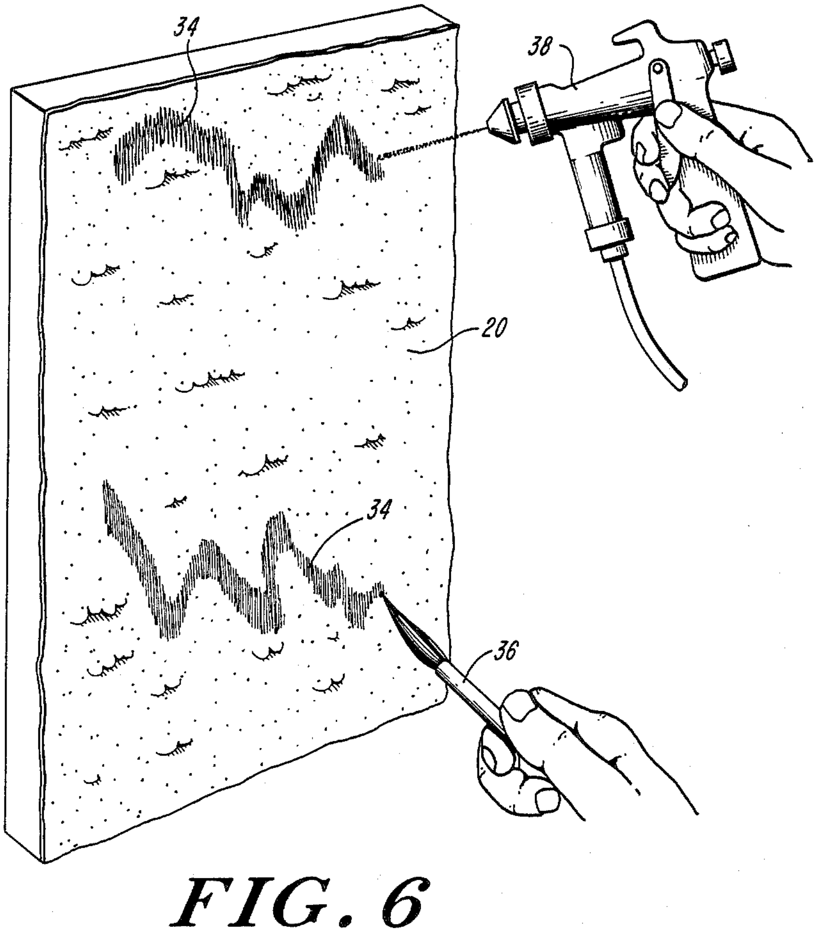
FIG. 6 illustrates the application of the marbleizing color pigment to the coated substrate.

In an alternative embodiment to the invention, a substrate is coated with a curable synthetic resin composition. Then, instead of applying a thin coating of fine particulate material directly to the coated surface of the substrate, the fine particulate material 18 is first coated onto the applicator 24. This may be accomplished by first dampening the applicator in water 30 (FIG. 5*a*) and then contacting the applicator with the fine particulate material (FIG. 5*b*). Then the coated applicator 32 (FIG. 5*c*) is brought into contact with the coated surface of the substrate in the blotting action described above. The same results as described above can be achieved. It is most preferable to combine the two techniques, that is, coat the resin composition as shown in FIG. 2 and coat the applicator as shown in FIGS. 5*a* and 5*b*. Combining the techniques reduces the likelihood that the resin composition will stick to the applicator.

The characteristics of the fine particulate material 18 will influence the appearance of the final cured product. For example, a smooth surface is more-readily achieved by using a fine particulate material having a smaller particle size than by using one having a larger particle size. Likewise, the color of the fine particulate material can influence the appearance of the final product. For example, it is preferable to use talcum powder or confectionery powdered sugar when simulating marble and it is preferable to use a silica aggregate when simulating granite. Talcum powder or confectionery powdered sugar applied to the coated surface is relatively translucent once the resin composition cures and the translucent marble-like appearance of the resin composition is maintained. Silica aggregate, on the other hand, is not translucent like talcum powder or powdered confectionery sugar when applied to the coated surface. Rather, the silica aggregate resembles particles naturally occurring in granite These particles become embedded in the coated surface and contribute to the granite-like appearance of the resin composition when the resin composition cures.

The step for simulating marble according to the invention is illustrated in FIG. 7. First, a composition is coated onto a substrate (FIG. 1). Subsequently, a color pigment 34 is applied to the coated surface 20 in a discontinuous marble-like pattern (FIG. 7). The color pigment may be a dry powder or a paste dispersion. It is preferably applied by hand brushing with a brush 36 or spraying with a spray gun 38 although other forms of application such as sprinkling are possible. Next, a thin coating of fine particulate material, preferably talcum powder, is applied to the coated surface 20 as illustrated in FIG. 2 and described above. Then, an applicator is applied to the particulate coated surface in a blotting action as shown in FIG. 3 and as described above. Finally, the resin composition is allowed to cure. It should be understood that various color combinations can be used to simulate various naturally-occurring marbles.

The products manufactured according to the invention are, in general, useful for most purposes for which natural stone materials are used. The products are useful for the production of walls, floors, ceilings, architectural facings, counter tops, sculpture, and many types of furniture. The surfaces produced according to this invention are superior to natural stone surfaces in many respects since they are substantially non-porous and, therefore, nonabsorbent and stain-resistant.

EXAMPLE 1

SIMULATED GRANITE

Resin Composition

Base Resin: Three quarts PolyLite® Polyester Resin 33-031 obtained from Reichhold Chemicals, Inc. of Elizabeth, N.J.

Thickener: Three quarts CAB-O-SIL® M-5 Fumed Silica obtained from Cabot Corp. of Tuscola, Ill.

Filler: One quart 18 Mystic White Quartz sand, obtained from Ottowa Silica Co. of Ottowa, Ill. and having approximately 98% silica ($SiO_2$) and a particle size falling in a range of 10–40 mesh.

Filler: 18 ounces #1240 BLACK BEAUTY® Mineral Abrasive, an amorphous mixture manufactured from boiler slag having a particle size ranging approximately from 12–40 mesh, obtained from Reed Minerals of Highland, Ind.

Color Pigment: 3 cc's Grey, #4310 PD P.M.S. polyester dispersed pigments obtained from P.M.S. Consolidated of Somerset, N.J.

Catalyst: 20 cc's SUPEROX®, MEK Peroxide 46-710, a methyl ethyl ketone peroxide having approximately 9% active oxygen peroxide in dimethyl phthyalate obtained from Reichhold Chemicals, Inc. of Elizabeth, N.J. The base resin, thickener, fillers and color pigment were thoroughly mixed together. The catalyst was then added to the mix. The resin composition was applied by spraying to a thickness of 1/16 of an inch to a plywood substrate within 20 minutes of adding the catalyst to create a coated surface. The coated surface was then dusted to saturation by hand with No. 85 Mystic White Quartz Sand obtained from Ottawa Silica Co. of Ottawa, Ill., and having approximately 98% Silica ($SiO_2$) and a particle size falling in a range of approximately 30–325 mesh. The surface was then tamped to a desired texture and smoothness using a water dampened applicator that was coated with No. 85 grit Mystic White Quartz Silica. The dusting and the tamping also occurred within 20 minutes of catalyzing the resin composition. Finally, the coated tamped surface was allowed to cure, prferably for one hour at 70° F. The final product resembled naturally-occurring granite both in texture and in appearance.

EXAMPLE 2

Marble Simulation

Resin Composition

Base Resin: Three quarts PolyLite ® Polyester Resin 33-031 obtained from Reichhold Chemicals, Inc. of Elizabeth, N.J.

Thickener: Three and a half quarts CAB-O-SIL ® M-5 obtained from Cabot Corp. of Tuscola, Ill.

Filler: One quart No. 85 Mystic White Quartz Sand obtained from Ottowa Silica Co. of Ottowa, Ill. and having approximately 98% silica ($SiO_2$) and a particle size falling in a range of approximately 30–325 mesh.

Color Pigment: 25 cc's white, #175 PD P.M.S. polyester dispersed pigment obtained from P.M.S. Consolidated of Somerset, N.J.

Catalyst: 20 cc's SUPEROX® MEK Peroxide 46-710, a methyl ethyl ketone peroxide having approximately 9% active oxygen peroxide in dimethyl phthyalate, obtained from Reichhold Chemicals, Inc. of Elizabeth, N.J.

Marbleizing Color Pigment 9 ounces PolyLite® Polyester Resin 33-031, obtained from Reichhold Chemicals, Inc. of Elizabeth, N.J.

9 ounces of acetone thinning agent obtained from Allied Chemicals of Weymouth, Mass.

15 cc's of Grey, #4310 PD P.M.S. polyester dispersed pigment obtained from P.M.S. Consolidated of Somerset, N.J.

The base resin, thickener, filler and color pigment were thoroughly mixed. Subsequently the catalyst was added. The resin composition was sprayed onto a plywood substrate to a thickness of 1/16 inch within 20 minutes of catalyzing the resin composition.

Immediately after applying the resin composition to the plywood substrate to produce a coated surface, the marbleizing color pigment was hand-brushed onto the coated surface in a discontinuance marble-like pattern. Following this, the coated surface was hand-dusted to saturation with talcum powder. Next the particulate coated surface was tamped to a desired texture and smoothness with a water dampened applicator that was coated with talcum powder. Finally, the resin composition was allowed to cure. The cured product simulated marble both in texture and appearance.

Approximately one pound of the resin composition described in the above examples applied to a substrate in a thickness of approximately 1/16 inch covers two square feet of substrate.

A thermoplastic material may be applied over the surface of the simulated stone product to create a scratch resistant surface.

It should be understood that various changes and modifications of the embodiment shown in the drawings may be made within the scope of this invention. Thus it is intended that all matter contained in the above description and shown in the accompanying drawings shall be interpreted in an illustrative and not limiting sense.

What I claim is:

1. A method for producing a simulated stone surface comprising, applying a curable synthetic resin composition to a substrate, applying a thin coating of fine particulate material to the surface of said composition to saturate the surface of the composition with the fine particulate material such that the surface is non-tacky, contacting said coated surface in a tamping action with an implement capable of carrying particles to ensure that said coated surface is completely covered with said fine particulate material so as to produce a surface simulating stone, and allowing the resin composition to cure.

2. A method for producing a simulated stone surface as claimed in claim 1 wherein said fine particulate material has an average particle size between 30 and 325.

3. A method for producing a simulated stone surface as claimed in claim 2 wherein said curable synthetic resin composition includes an unsaturated polyester resin.

4. A method for producing a simulated stone surface as claimed in claim 3 wherein said curable synthetic resin composition includes a thickener.

5. A method for producing a simulated stone surface as claimed in claim 4 wherein said curable resin composition includes a filler.

6. A method for producing a simulated stone surface as claimed in claim 5 wherein said curable synthetic resin composition includes a color pigment.

7. A method for producing a simulated stone surface as claimed in claim 6 wherein said coloring agent is a gray polyester color pigment dispersion, said fine particulate material is silica, and said filler is silica aggregate and boiler slag having a particle size between about 12–40 mesh.

8. A method for producing a simulated stone surface as claimed in claim 7 wherein said curable synthetic resin composition includes a methyl ethyl ketone peroxide catalyst.

9. A method for producing a simulated stone surface as claimed in claim 2 wherein the thin coating of fine particulate material is applied by first coating the implement with said fine particulate material and then contacting the surface with the coated implement.

10. A method for producing a simulated stone surface as claimed in claim 1 further comprising dampening said implement and contacting said dampened implement with said fine particulate material prior to contacting said surface with said implement.

11. A method for producing a simulated stone surface as claimed in claim 10 wherein the surface of said implement is cloth and said cloth surface is dampened.

12. A method for producing a simulated stone surface as claimed in claim 1 wherein a surface of said implement contacting said coated surface of said composition is dampened cloth.

13. A method for producing a simulated stone surface comprising, applying a curable synthetic resin composition to a substrate, applying a color pigment to the surface of said composition in a marble-like discontinuous manner, applying a thin coating of fine particulate material to the surface of said composition to saturate the surface of the composition with the fine particulate material such that the surface is non-tacky, contacting the surface in a tamping action with an implement capable of carrying particles to ensure that said coated surface is completely covered with said fine particulate material so as to produce a surface simulating stone, and allowing the resin composition to cure.

14. A method for producing a simulated stone as claimed in claim 13 wherein said fine particulate material has an average particle size of between about 45 and 200 grit.

15. A method for producing a simulated stone surface as claimed in claim 14 wherein said thin coating of fine particulate material is applied by first coating an applicator with said fine particulate material and then contacting the surface of said composition with said coated applicator.

16. A method for producing a simulated stone surface as claimed in claim 13 wherein said fine particulate material is talcum powder.

17. A method for producing a simulated stone surface as claimed in claim 13 further comprising dampening said implement and contacting said dampened implement with said fine particulate material prior to contacting said surface with said implement.

18. A method for producing a simulated stone surface as claimed in claim 17 wherein the surface of said implement is cloth and said cloth surface is dampened.

19. A method for producing a simulated stone surface comprising, applying a curable synthetic resin composition to a substrate, applying a thin coating of fine particulate material to the surface of said composition to saturate the surface of the composition with fine particulate material such that the surface is non-tacky, coating an implement with said fine particulate material, contacting said coated surface of said resin composition in a tamping action with said coated implement and, allowing the tamped, coated resin composition to cure.

20. A method for producing a simulated stone surface as claimed in claim 19 wherein said implement is coated with said fine particulate material by dampening a surface of said implement and contacting said dampened surface with said fine particulate material.

21. A method for producing a simulated simulated stone surface as claimed in claim 20 wherein the surface of said implement is cloth.

22. A simulated stone product comprising, a substrate having a surface, a curable synthetic resinous composition applied to said surface, and a thin layer of fine particulate material applied to saturate the surface of the composition and contacted in a tamping action with an implement capable of carrying particles to ensure that said coated surface is completely covered with said fine particulate material before said composition cures to produce a coated surface simulating stone.

23. A simulated stone product as claimed in claim 22 wherein said fine particulate material has an average particle size between 30 and 325 grit.

24. A simulated stone product as claimed in claim 23 wherein said fine particulate material is silica.

25. A simulated stone product comprising, a substrate having a surface, a curable synthetic resin composition applied to said surface to product a coating surface, a color pigment applied to the coated surface, and a thin layer of fine particulate material applied to saturate the coated surface of the composition and contacted in a tamping action with an implement capable of carrying particles to ensure that said coated surface is completely covered with said fine particulate material before the curable synthetic resin composition cures to produce a surface simulating stone.

26. A simulated stone product as claimed in claim 25 wherein said fine particulate material is translucent after it is applied to the coated surface and the curable synthetic resin composition cures.

27. A simulated stone product as claimed in claim 26 wherein said fine particulate material has an average particle size ranging from 30 to 325.

28. A simulated stone product as claimed in claim 27 wherein said fine particulate material is talcum powder.

* * * * *